(12) United States Patent  
Kobayashi et al.

(10) Patent No.: US 12,026,417 B2  
(45) Date of Patent: Jul. 2, 2024

(54) INFORMATION PRESENTATION SYSTEM, TERMINAL DEVICE, AND RECORDING MEDIUM

(71) Applicant: OMRON CORPORATION, Kyoto (JP)

(72) Inventors: Yoshiaki Kobayashi, Muko (JP); Yuta Nagata, Kyoto (JP); Yuya Watanabe, Muko (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/269,703

(22) PCT Filed: Mar. 11, 2021

(86) PCT No.: PCT/JP2021/009846  
§ 371 (c)(1),  
(2) Date: Jun. 26, 2023

(87) PCT Pub. No.: WO2022/153567  
PCT Pub. Date: Jul. 21, 2022

(65) Prior Publication Data  
US 2024/0061632 A1  Feb. 22, 2024

(30) Foreign Application Priority Data  
Jan. 15, 2021 (JP) ................. 2021-004730

(51) Int. Cl.  
*G06F 3/14* (2006.01)  
*G06F 3/01* (2006.01)  
(Continued)

(52) U.S. Cl.  
CPC ............ *G06F 3/14* (2013.01); *G06F 3/013* (2013.01); *G09G 3/32* (2013.01); *G09G 5/10* (2013.01)

(58) Field of Classification Search  
CPC .. G06F 3/14; G06F 3/013; G06F 3/011; G06F 3/0481; G06F 3/04842; G09G 3/32;  
(Continued)

(56) References Cited

U.S. PATENT DOCUMENTS 10,521,926 B1 * 12/2019 De Nardi ............. H04N 13/271  
10,559,195 B2 *  2/2020 Sahara ................... G08C 23/04  
(Continued)

FOREIGN PATENT DOCUMENTS

JP  6-020175 A  1/1994  
JP  2008-171084 A  7/2008  
(Continued)

OTHER PUBLICATIONS

International Search Report for PCT/JP2021/009846 dated, May 25, 2021 (PCT/ISA/210).

(Continued)

*Primary Examiner* — Amit Chatly  
(74) *Attorney, Agent, or Firm* — Sughrue Mion, PLLC

(57) ABSTRACT

An information presentation system includes a controller that controls a device included in a production line, a terminal including a display and a camera that captures an image of the device, and a server that communicates with the controller and the terminal. The camera has an image capture range including a view field of the display. The controller transmits a light emission command to the device, the light emission command causing a light emitter included in the device to emit light in a predetermined light emission pattern. The terminal displays information regarding the device in association with a display position in a display area of the display, the display position corresponding to a position of a partial image representing the light emission pattern in a captured image of the camera.

13 Claims, 14 Drawing Sheets

(51) Int. Cl.
*G09G 3/32* (2016.01)
*G09G 5/10* (2006.01)

(58) Field of Classification Search
CPC . G09G 5/10; G09G 5/00; G09G 5/377; G05B 2219/32014; H04N 7/183; G06T 11/00
See application file for complete search history.

(56) References Cited

U.S. PATENT DOCUMENTS

| | | | |
|---|---|---|---|
| 11,671,311 B2* | 6/2023 | Randall | H04L 49/40 |
| | | | 709/224 |
| 2014/0270792 A1* | 9/2014 | Zhang | H04B 10/116 |
| | | | 398/118 |
| 2020/0279437 A1* | 9/2020 | Iwase | G06T 19/003 |
| 2020/0409643 A1* | 12/2020 | Huie | G06V 40/67 |
| 2021/0162927 A1* | 6/2021 | Takii | H04N 7/18 |
| 2022/0417479 A1* | 12/2022 | Aoki | G09G 5/38 |
| 2023/0081768 A1* | 3/2023 | Chung | G06F 3/0362 |
| | | | 345/156 |

FOREIGN PATENT DOCUMENTS

| | | |
|---|---|---|
| JP | 2017-224229 A | 12/2017 |
| JP | 2019-068239 A | 4/2019 |

OTHER PUBLICATIONS

Written Opinion of the International Searching Authority for PCT/JP2021/009846 dated, May 25, 2021 (PCT/ISA/237).

* cited by examiner

FIG.4

| EVENT TYPE 152A | DEVICE ID 152B | EVENT CODE 152C |
|---|---|---|
| ABNORMAL OUTPUT OF AIR CYLINDER (TH) | XY-xx | 0x12345678 |
| ABNORMAL OUTPUT OF COMMUNICATION DEVICE (TH) | E3Z-xxx-LL | 0x12345679 |
| ABNORMAL OUTPUT OF NEARBY SENSOR (TH) | YZ-xx | 0x12345680 |
| SIGN: FREQUENT OCCURRENCE OF FLAW DETECTION (TH) | RZ-xx | 0x12345681 |
| ... | ... | ... |

⇐ 1521

| EVENT CODE 152C | LIGHT EMISSION PATTERN 152D |
|---|---|
| 0x12345678 | P1 |
| 0x12345678 | P2 |
| 0x12345680 | P3 |
| 0x12345681 | P4 |

(A)

| DEVICE ID 152B | LIGHT EMISSION PATTERN 152D |
|---|---|
| XY-xx | P11 |
| E3Z-xxx-LL | P12 |
| YZ-xx | P13 |
| RZ-xx | P14 |

(B)

INFORMATION PRESENTATION SYSTEM, TERMINAL DEVICE, AND RECORDING MEDIUM

CROSS REFERENCE TO RELATED APPLICATIONS

This application is a National Stage of International Application No. PCT/JP2021/009846 filed Mar. 11, 2021, claiming priority based on Japanese Patent Application No. 2021-004730 filed Jan. 15, 2021, the contents of each of which being herein incorporated by reference in their entireties.

TECHNICAL FIELD

This disclosure relates to an information presentation system, and more particularly, to an information presentation system that presents information regarding a device as a control target.

BACKGROUND ART

As a technique for presenting a state of equipment, PTL 1 (Japanese Patent Laying-Open No. 2019-68239) discloses a device that determines whether a signal lamp is in a continuous turn-on state, a blinking state, or a continuous turn-off state, on the basis of light emission information of the signal lamp that displays information of processing equipment, and manages the state of the processing equipment.

An equipment monitoring portable terminal of PTL 2 (Japanese Patent Laying-Open No. 2017-224229) provides an environment for equipment monitoring using an augmented reality expression by superimposing and displaying an explanatory sentence over an image of an electronic control device 10 that is being taken (overlay display).

PTL 3 (Japanese Patent Laying-Open No. 2008-171084) discloses a design support device for a sequence program of a production line. The design support device is configured to display a state of a signal output from equipment on a line by turning on and off a plurality of light emitting module provided corresponding to the signal, read the displayed state of the signal, and write the read state of the signal in the sequence program as an operation condition for proceeding to the next step.

CITATION LIST

Patent Literatures

PTL 1: Japanese Patent Laying-Open No. 2019-68239
PTL 2: Japanese Patent Laying-Open No. 2017-224229
PTL 3: Japanese Patent Laying-Open No. 2008-171084

SUMMARY OF INVENTION

Technical Problem

Examples of usage scenes of information presented regarding a device in a production line include a usage scene for supporting handling on site when an abnormality or a sign of abnormality of the device is detected. There is a demand that a worker wishes to acquire of information of a device on site while specifying a location site of a target device on a production line actually viewed by a user, and perform work (operation) on the device while confirming the information.

While PTLs 1, 2, and 3 proposes mechanisms for presenting information for monitoring equipment of a production line, one of these proposes an environment for presenting a location site of a target device and information regarding the device in association with each other in a view field of a user.

One object of the present disclosure is to provide an information presentation system that presents information regarding a target device in association with a location site of the device within a view field of a user.

Solution to Problem

In the present disclosure, an information presentation system includes: a controller configured to control a device included in a production line; a terminal including a display and a camera configured to capture an image of the device; and a server configured to communicate with the controller and the terminal, wherein the camera has an image capture range including a view field of the display, the controller includes a module configured to transmit a light emission command to the device, the light emission command causing a light emitting unit included in the device to emit light in a predetermined light emission pattern, and the terminal includes a module configured to display information regarding the device in association with a display position in a display area of the display, the display position corresponding to a position of a partial image representing the light emission pattern in a captured image of the camera.

According to the above disclosure, it is possible to present information by displaying the information regarding the device on the display in association with the location site of the device in the view field via the display of the user.

In the above disclosure, the controller further includes a module configured to cause a light emitting unit included in another device near the device to emit light in a pattern different from the light emission pattern.

According to the above disclosure, the user can be guided to a target device by causing other devices near the target device to emit light.

In the above disclosure, the information regarding the device includes information indicating a state of the device. According to this disclosure, the state of the device can be displayed as the information regarding the device.

In the above disclosure, the server transmits a notification for specifying the light emission pattern to the controller. As a result, the controller can acquire the light emission pattern from the server.

In the above disclosure, the server includes: an image processing module configured to process the captured image received from the terminal, and detect a position of the partial image representing the light emission pattern in the captured image; and a module configured to transmit the position of the partial image detected by the image processing module to the terminal.

According to the above disclosure, it is possible to cause the server to perform the image processing for position detection.

In the above disclosure, the server transmits a notification for specifying the light emission pattern to the terminal, and the terminal further includes an image processing module configured to process the captured image of the camera, and detect a position of the partial image representing the light emission pattern in the captured image.

According to the above disclosure, it is possible to cause the terminal to perform the image processing for position detection.

In the above disclosure, the server determines the light emission pattern based on identification information of the device. As a result, the light emission pattern can be variably determined on the basis of the identification information of the device.

In the above disclosure, the server determines the light emission pattern based on a state of the device. As a result, the light emission pattern can be variably determined on the basis of the state of the device.

In the above disclosure, the controller determines a state of the device based on a state value output from the device, and transmits a notification of the determined state to the server. As a result, it is possible to cause the device to emit light when the controller determines that the device is in a predetermined state.

In the above disclosure, the controller transmits a database operation command to the server, the database operation command being for storing information indicating a state of the device in a database included in the server, and the server determines the state of the device based on the information stored in the database.

According to the above disclosure, the state of the device can be determined on the basis of data accumulated in the database of the server.

In the above disclosure, the controller outputs the light emission command to a device designated based on a user operation. As a result, the controller can output the light emission command to a device designated by the user, and cause the device to emit light.

In the above disclosure, the terminal further includes a gaze sensor configured to detect a gazing direction of a user operating the terminal, and an image capturing direction of the camera coincides with the gazing direction.

According to the above disclosure, when a device emits light and a user gazes at a direction where the device is located, the camera captures an image of the gazing direction. As a result, it is possible to increase certainty that the device is included in a subject.

A terminal device of the present disclosure is a terminal device including: a module configured to communicate with a controller that controls a device included in a production line; a display; and a camera configured to capture an image of the device, wherein the camera has an image capture range including a view field of the display, the device includes a light source configured to emit light in a predetermined light emission pattern based on a light emission command from the controller, and the terminal device further includes a module configured to display information regarding the device in association with a display position in a display area of the display, the display position corresponding to a position of a partial image representing the light emission pattern in a captured image of the camera.

According to the above disclosure, it is possible to present the information regarding the device by displaying the information regarding the device on the display in association with the location site of the device in the view field via the display of the user.

The present disclosure provides a non-transitory machine-readable recording medium having stored thereon a program, when executed by a processor, for causing the processor included in a terminal device to perform an information presentation method. The terminal device includes: a module configured to communicate with a controller that controls a device included in a production line; a display; and a camera configured to capture an image of the device, the camera has an image capture range including a view field of the display, the device includes a light source configured to emit light in a predetermined light emission pattern based on a light emission command from the controller, and the information presentation method includes: acquiring a position that is a display position in a display area of the display and that is a position of a partial image representing the light emission pattern in a captured image of the camera; and controlling the display to display information regarding the device in association with the acquired display position in the display area of the display.

According to the above disclosure, when the program is executed, the information regarding the device can be displayed on the display in association with the location site of the device in the view field via the display of the user, and thus it is possible to present the information regarding the device.

Advantageous Effects of Invention

According to the present disclosure, it is possible to present information regarding a target device in association with a location site of the device within a view field of a user.

BRIEF DESCRIPTION OF DRAWINGS

FIG. 4 is a diagram illustrating an example of an event code table 152 according to the present embodiment.

DESCRIPTION OF EMBODIMENTS

Figure 1:
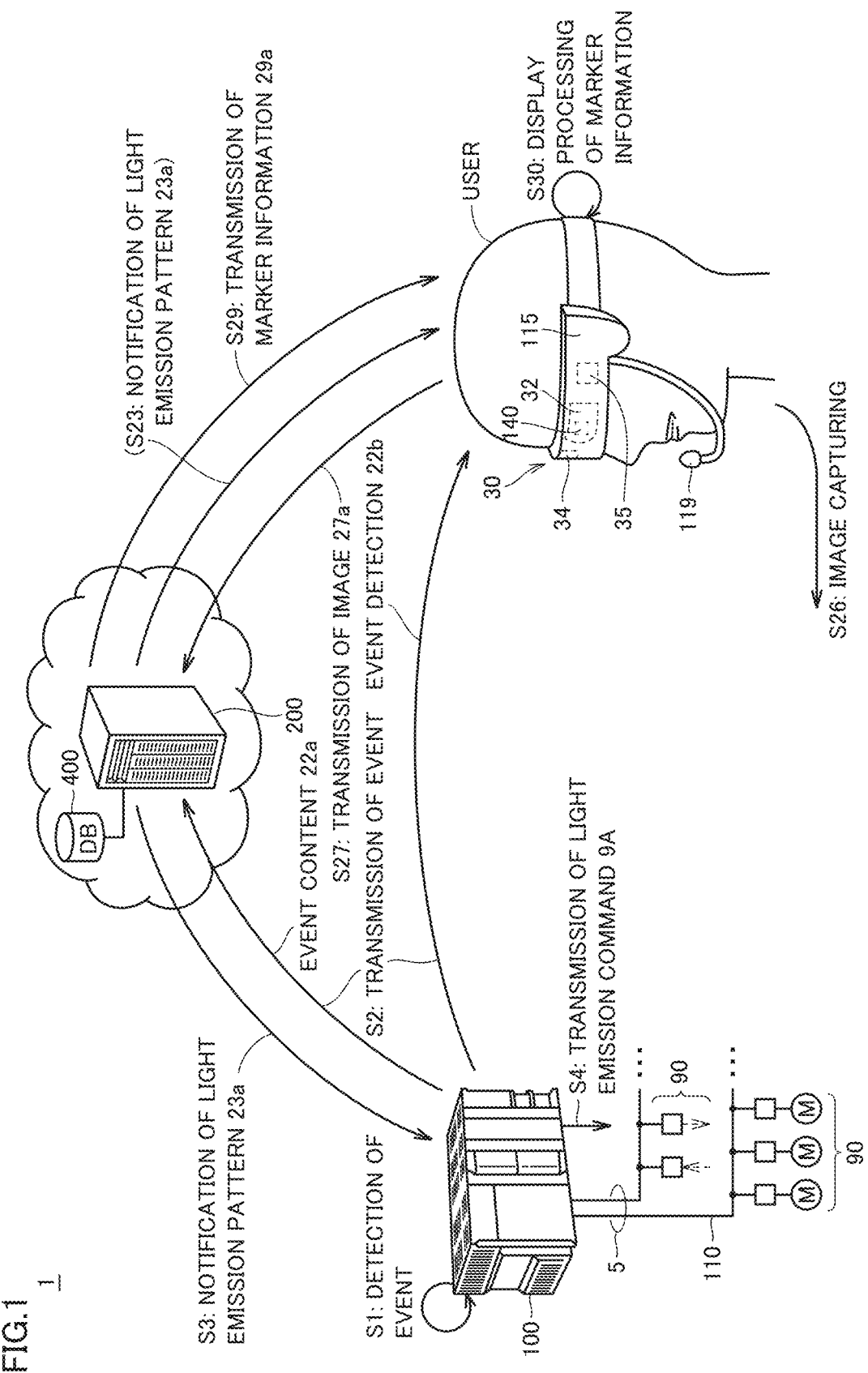
FIG. 1 is a schematic diagram illustrating an overall configuration example of a network system 1 according to the present embodiment.

Embodiment of the present disclosure will be described in detail with reference to the drawings. The same or corresponding parts in the drawings are denoted by the same reference numerals, and the descriptions thereof will not be repeated.

A. Application Example

First, an example of a scene to which the present invention is applied will be described with reference to FIG. 1.

FIG. 1 is a schematic diagram illustrating an overall configuration example of a network system 1 according to the present embodiment. In the present disclosure, network system 1 is an example of an "information presentation system". Although network system 1 is intended to be a "maintenance system" that enables on-site maintenance of a device or equipment included in a production line as a main use form, the technical scope of the present invention is not limited to the scope of this term, and should be reasonably interpreted on the basis of the description of the claims.

Network system 1 shares various types of information of a target device or equipment, and provides a platform for giving a command to the target device or equipment as necessary.

In the example shown in FIG. 1, the target device or equipment includes a programmable logic controller (PLC) 100 and one or more field devices 90. Although FIG. 1 illustrates one PLC 100, network system 1 may include more than one PLC 100. When more than one PLC 100 is provided, more than one PLC 100 may be connected to a field network. As the field network, an industrial network such as EtherCAT (registered trademark) or EtherNet/IP (registered trademark) may be used.

PLC 100 corresponds to an industrial controller, and controls various manufacturing equipment and machines that are not illustrated according to a control cycle. In the control by PLC 100, information (a state value 110) indicating a state of field device 90 is collected using a device such as field device 90 including a sensor via a field network 5, and according to a program executed by PLC 100, a predetermined control calculation is periodically executed using the collected information according to the control cycle, so that a control command is calculated and output to the field device such as an actuator. In PLC 100, the control command is calculated by executing control calculation such as a sequence program and a motion program. Field device 90 operates under control according to the control command, and state value 110 changes.

Field device 90 is an example of a target controlled by PLC 100 by communicating with PLC 100 via field network 5. Data exchanged between PLC 100 and field device 90 via field network 5 is updated in a very short cycle of several 100 μsec order to several 10 msec order synchronized with the control cycle. Here, such update processing of exchanged data is also referred to as input/output refresh.

Field device 90 includes one or more light emitting diodes (LEDs) as a light emitting unit, and is driven to emit light in order to notify a state of output or operation of the field device. The LEDs emit visible light of different or the same wavelengths. In the present disclosure, field device 90 changes a pulse width or a period of a LED drive signal (current signal) over time on the basis of a light emission command 9A from PLC 100. As a result, the LED of field device 90 emits light in a pattern according to light emission command 9A. For example, a pulse width modulation (PWM) circuit can be applied to generate the LED drive signal.

Network system 1 includes a terminal 30 that can be worn by a worker (user) on the head and a server 200 that communicates with PLC 100 and terminal 30 in addition to the target equipment (PLC 100 and field device 90). Server 200 is typically provided outside factories, and in the present embodiment, provided as a cloud-based server for example.

Server 200 receives data including at least one of an image and an audio from at least one of terminal 30 and PLC 100 connected via the network, processes the received data, and transmits the processing result data to PLC 100 or terminal 30. Server 200 can also have a function as a database server that manages DB (abbreviation of database) 400. PLC 100 transfers state value 110 collected in synchronization with the control cycle to server 200 together with a database operation command (such as Structured Query Language (SQL)). Server 200 stores state value 110 received from PLC 100 in database 400 according to the database operation command. As a result, state values 110 are collected in database 400 in time series. Server 200 reads data such as state value 110 from database 400 and processes the read data. Server 200 can also store the control command transmitted from PLC 100 in database 400 in association with state value 110, for example.

Terminal 30 is an example of a "terminal device", and may be worn by a user (worker) on the head in a form of a head-mounted device (HMD), more specifically, in a form of a glasses-type display. Terminal 30 has housing 115 containing a transmissive display 32 of a liquid crystal display type or the like, a gaze sensor 140, a speaker 35, a microphone 119, and a camera 34.

The user can view a real space (scenery) through transmissive display 32. Furthermore, in a case where an object (an image such as photographs, pictures, characters/numerical values, symbols, and graphs) is displayed on transmissive display 32, the object is displayed in a superimposed manner over the scenery in the real space. With the object displayed in a superimposed manner, terminal 30 provides so-called augmented reality (augmented reality) to the user.

Camera 34 is an imaging device having optical characteristics, and includes a charge coupled device (CCD), for example. When terminal 30 is worn, a view field corresponding to a display area of transmissive display 32 that can be viewed by the user through transmissive display 32 corresponding to a lens of glasses is an image capture range of camera 34. For example, in a case where the user wearing terminal 30 operates field device 90, the operation can be supported using an augmented reality mechanism. More specifically, transmissive display 32 displays, in a superimposed manner, an object that supports the operation over a scenery in a real space, that is, a real landscape including field device 90. As a result, the user can operate field device 90 in the view field while being supported by the information indicated by the object displayed in a superimposed manner over the real landscape in the view field in an augmented reality (Augmented Reality) manner. The operation of field device 90 by the user may also include an operation for confirming or adjusting the state of the operating of field device 90.

Gaze sensor 140 detects a direction to which a line of sight of the user wearing terminal 30 is directed (eye direction). The detection of this direction is realized by a known eye tracking function, for example. Camera 34 is controlled so that the eye direction of the user detected by gaze sensor 140 coincides with an image capturing direction.

The present embodiment includes a head posture detection unit that detects a head posture (position and orientation (inclination)) of the user. The head posture detection unit includes, for example, a gyroscope sensor 341 provided in camera 34 and described later. A signal processing/image processing circuit 300 described later calculates (estimates) a viewing angle of the user from an output of the head posture detection unit, for example, according to a predetermined calculation expression. Signal processing/image processing circuit 300 controls an angular field of camera 34 so that the viewing angle of the user matches the angular field. As a result, signal processing/image processing circuit 300 can change the angular field of camera 34 to follow the change in the viewing angle based on the head posture of the user. As a result, the view field of transmissive display 32 can be included in the image capture range of camera 34. Although gyroscope sensor 341 is provided in camera 34, the attachment place is not limited to camera 34 as long as the posture of the head can be detected.

As a scene in which augmented reality is provided to the user wearing terminal 30 through transmissive display 32, a case where the operating state of field device 90 becomes a predetermined state will be described as an example. The predetermined state of field device 90 may be an abnormal state including a failure of field device 90 or a state indicating a sign of an abnormality (hereinafter referred to as sign state). For example, PLC 100 compares state value 110 from field device 90 with a threshold value, and detects, as an event, that field device 90 has transitioned to the predetermined state on the basis of the comparison result. PLC 100 can periodically perform the event detection processing in synchronization with, for example, a control cycle.

When an event is detected (step S1), PLC 100 transmits a notification of a detected event content 22*a* (a device ID (identifier) of field device 90 and information on the event) to server 200 (step S2), and transmits a notification of event detection 22*b* to terminal 30 (step S2). Upon reception of the notification of the event content from PLC 100, server 200 transmits a notification of a light emission pattern 23*a* based on the event content to PLC 100 (step S3), and PLC 100 generates light emission command 9A based on light emission pattern 23*a* from the server 200 and outputs light emission command 9A to field device 90 (step S4). The LED of the light emitting unit of field device 90 emits light according to a pattern indicated by light emission command 9A according to light emission pattern 23*a*. A mode of light emission includes blinking (switching of a lighting cycle), switching of a light emission color, and the like.

The user wearing terminal 30 directs the user's eyes to field device 90 that emits light. Camera 34 causes the image capturing direction to coincide with the eye direction on the basis of an output of gaze sensor 140. As a result, field device 90 that the user gazes at (that is, is in the view field) is located within the image capture range of camera 34. In response to reception of the notification of the event detection 22*b* from PLC 100, terminal 30 causes camera 34 to start image capturing (step S26), and transmits an image 27*a* that has been captured to server 200 (step S27). Imaging by camera 34 may be started, for example, in response to the reception of the notification of event detection 22*b* from PLC 100.

Server 200 performs image processing on image 27*a* from the terminal 30 in units of frames, for example, to detect a partial image whose luminance is changed in accordance with light emission pattern 23*a* in image 27*a*, performs position detection processing of determining a position of the partial image in image 27*a*, and transmits a marker information 29*a* including the determined position and an AR marker to terminal 30 (step S29). Server 200 generates the AR marker as an object for displaying event content 22*a* indicated by the notification received from PLC 100.

Terminal 30 receives marker information 29*a* from server 200 and performs processing of displaying the received AR marker (step S30). More specifically, terminal 30 causes transmissive display 32 to display the AR marker in association with a position in the display area of transmissive display 32 corresponding to the determined position of marker information 29*a* from server 200. As a result, the AR marker is visually displayed in association with field device 90 (the LED of field device 90) emitting light according to light emission pattern 23*a* in the view field of the user through transmissive display 32.

In the above configuration, the detection processing of the partial image whose luminance is changed according to light emission pattern 23*a* is performed by server 200, but may be performed by terminal 30. In this case, server 200 transmits light emission pattern 23*a* to terminal 30 (step S23), and terminal 30 performs image processing of detecting a partial image whose luminance is changed in accordance with light emission pattern 23*a* from server 200 in image 27*a* captured by camera 34, and determines a position of the partial image in image 27*a* on the basis of the result of the image processing. Terminal 30 performs the above display processing (step S30) on the basis of the determined position and the AR marker from server 200.

Microphone 119 collects voice of utterance of the user, and terminal 30 transmits voice data corresponding to the collected voice to server 200. Server 200 analyzes the voice data from terminal 30 and transmits information based on the analysis result to terminal 30 as the AR marker. Terminal 30 displays the AR marker in association with the above-described determined position. As a result, the user can also acquire an additional AR marker by speaking using microphone 119. A presentation mode of the information regarding field device 90 indicated by the AR marker is not limited to the display, and the information may be output by voice from speaker 35 by a voice reading function.

In the present disclosure, information regarding field device 90, for example, event content (device ID, AR marker, and the like) can be presented in association with the location site of the field device in the view field of the user through transmissive display 32. The user wearing terminal 30 can handle a failure or a sign of failure of field device 90 by operating field device 90 in the view field through transmissive display 32 with reference to the information presented by the AR marker or the like. Hereinafter, as a more specific application example of the present invention, a more detailed configuration and processing of network system 1 according to the present embodiment will be described.

B. System Configuration

Figure 2:
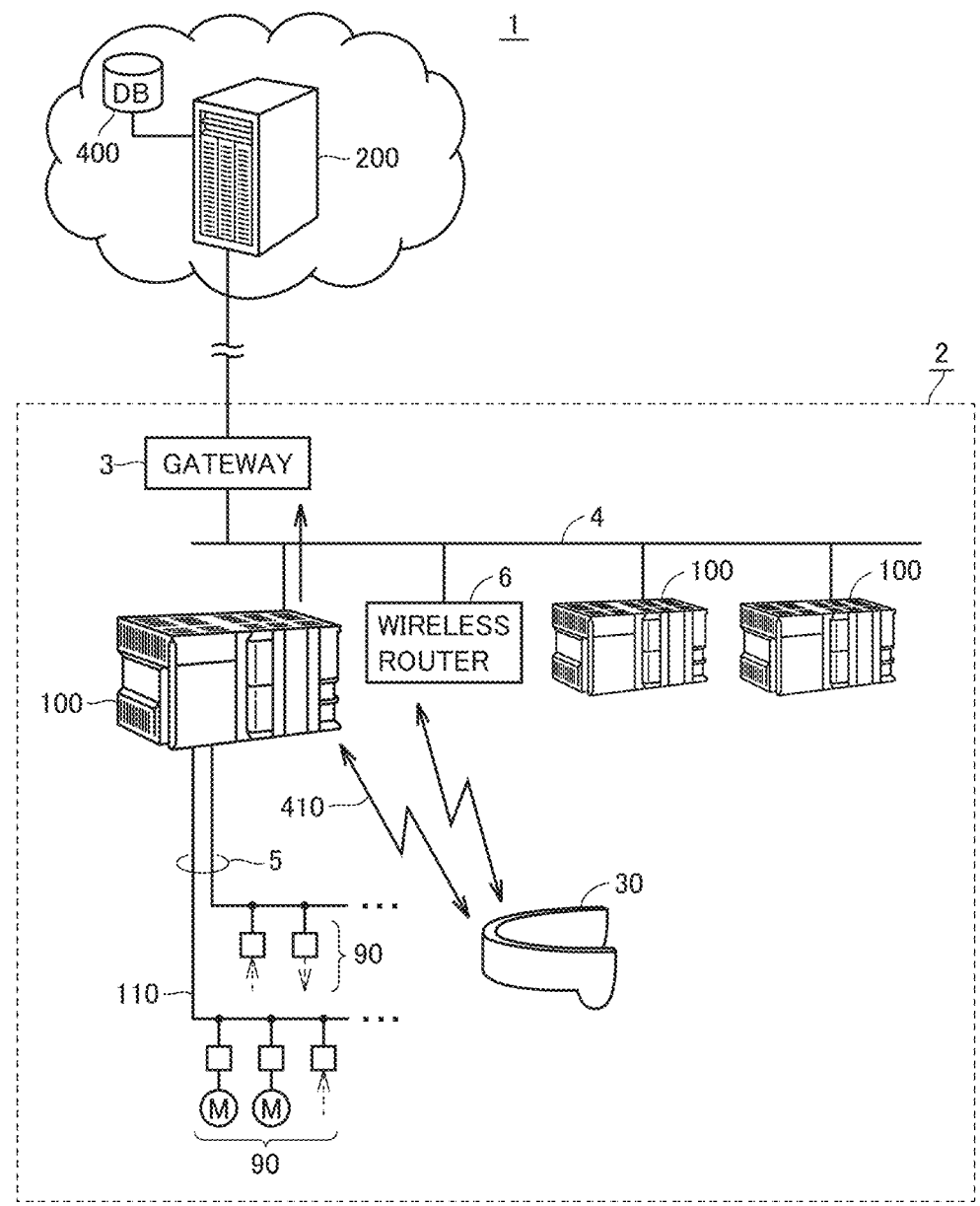
FIG. 2 is a schematic diagram illustrating an overall configuration example of network system 1 according to the present embodiment.

FIG. 2 is a schematic diagram illustrating an overall configuration example of network system 1 according to the present embodiment. Network system 1 includes an equipment device 2 as a maintenance target including one or more PLCs 100. PLC 100 may be connected to a field network 4. As field network 4, an industrial network such as EtherCAT (registered trademark) or EtherNet/IP (registered trademark) may be used. Field network 4 connects a gateway terminal 3 for connecting components connected to field network 4 to server 200 and a wireless router 6 for connecting terminal 30 as a portable terminal to field network 4. Terminal 30 exchanges data with PLC 100 through wireless communication 410. Terminal 30 communicates with PLC 100 and wireless router 6 according to a wireless local area network (LAN). Terminal 30 communicates with PLC 100 according to Bluetooth (registered trademark), for example, and communicates with wireless router 6 according to either Bluetooth or Wi-Fi (registered trademark). Terminal 30 can also communicate with server 200 according to long term evolution (LTE), for example, without relaying through wireless router 6, and a virtual private network (VPN) can be applied as a communication path.

B1. Configuration of PLC 100

Figure 3:
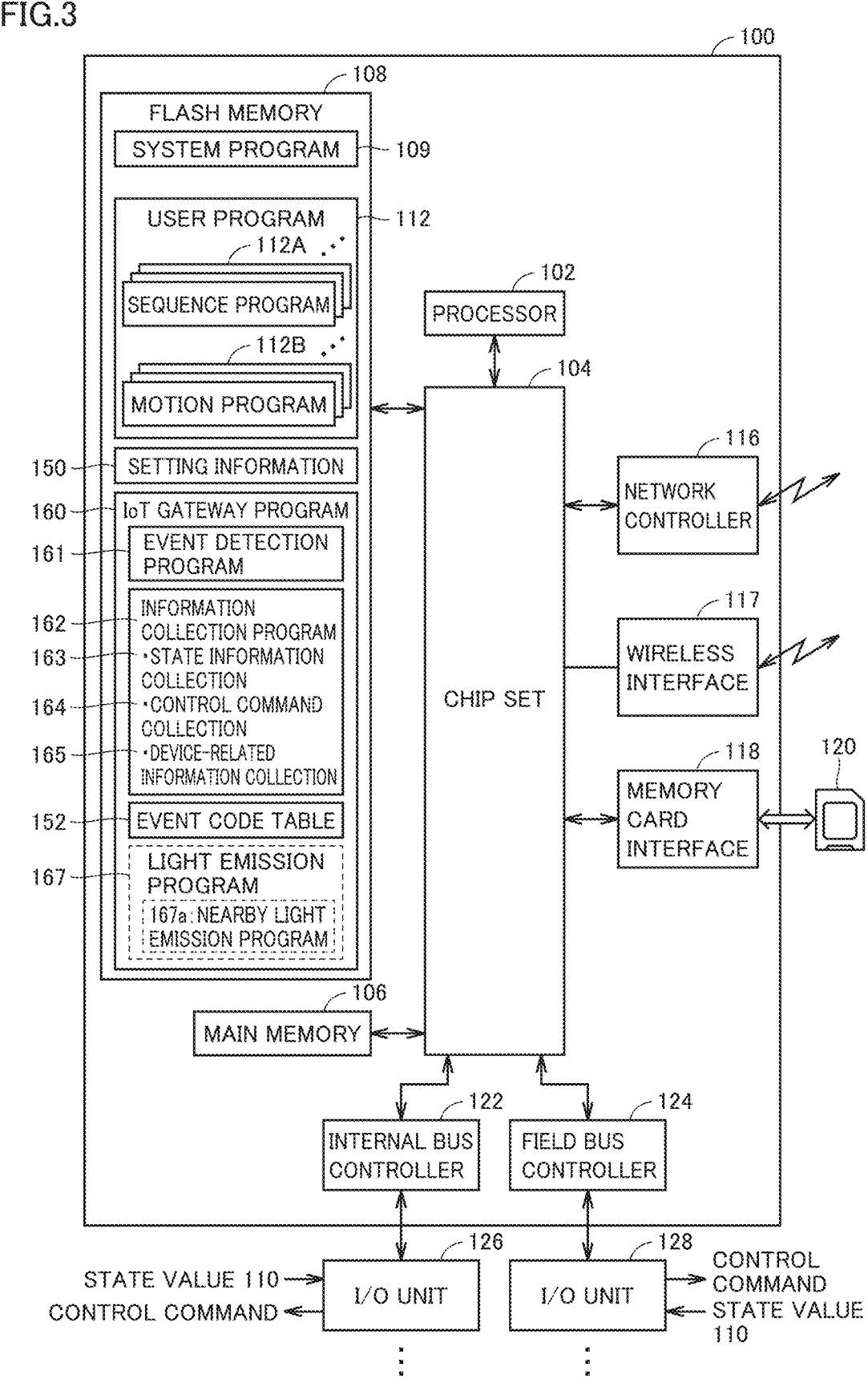
FIG. 3 is a schematic diagram illustrating a configuration example of a PLC 100 according to the present embodiment.

FIG. 3 is a schematic diagram illustrating a configuration example of PLC 100 according to the present embodiment. Referring to FIG. 3, PLC 100 realizes control on a control target by a processor executing a program that is installed in advance. More specifically, PLC 100 includes a processor 102 such as a central processing unit (CPU) or a microprocessing unit (MPU), a chip set 104, a main memory 106, a flash memory 108, a network controller 116, a wireless interface 117 including a wireless communication circuit, a memory card interface 118, an internal bus controller 122, and a field bus controller 124.

Processor 102 reads a system program 109, a user program 112, and an IoT gateway program 160 stored in flash memory 108, develops them in main memory 106, and executes them. When user program 112 is executed under system program 109, control for the control target is realized. That is, processor 102 realizes a control unit that executes input/output refresh and control calculation by being linked with main memory 106 and flash memory 108.

System program 109 includes instruction codes for providing basic functions of PLC 100, such as data input/output processing and execution timing control. User program 112 is arbitrarily designed according to the control target, and includes a sequence program 112A for executing sequence control, a motion program 112B for executing motion control, and an input/output refresh program (not illustrated).

Chip set 104 realizes processing of PLC 100 as a whole by controlling each component. Internal bus controller 122 is an interface that exchanges data between PLC 100 and I/O unit 126 connected through an internal bus. Field bus controller 124 is an interface that exchanges data between PLC 100 and an I/O unit 128 connected through a field bus. Internal bus controller 122 and field bus controller 124 acquire state values 110 input to I/O units 126 and 128, respectively, and output calculation results by processor 102 as control command from I/O units 126 and 128, respectively.

Memory card interface 118 is configured such that memory card 120 is detachable, and can write data to memory card 120 and read data from memory card 120.

Network controller 116 controls data exchange through various networks including field network 4. Wireless interface 117 controls data exchange with a wireless communication device such as terminal 30.

Flash memory 108 further holds (stores) setting information 150, event code table 152, a light emission program 167, and a nearby light emission program 167a, in addition to the IoT gateway program 160 for realizing network system 1 of the present embodiment. Setting information 150 includes information for managing users of network system 1, information for managing devices such as field devices 90 constituting network system 1, and the like.

FIG. 4 is a diagram illustrating an example of event code table 152 according to the present embodiment. Referring to FIG. 4, event code table 152 includes a plurality of sets each including a device ID 152B as an identifier of field device 90 and an event type 152A, and an event code 152C associated with each set. Event type 152A includes a threshold value TH for determining the state (abnormal or sign state) of field device 90 with corresponding device ID 152B.

When executed, light emission program 167 generates light emission command 9A according to light emission pattern 23a received from server 200, and transmits light emission command 9A to field device 90 indicated by the device ID included in light emission pattern 23a. When executed, nearby light emission program 167a transmits a light emission command 9B according to a nearby light emission pattern 33a received from server 200 to one or more field devices 90 indicated by the device ID of nearby light emission pattern 33a.

IoT gateway program 160 is an example of a program that is executed to cause PLC 100 to operate as a component of the information presentation system. IoT gateway program 160 includes an information collection program 162 and an event detection program 161 that detect an event on the basis of the state (abnormality or sign) of field device 90 from state value 110 output from field device 90 under control.

When executed, information collection program 162 performs state information collection 163 and control command collection 164 for collecting state value 110 and the control command exchanged with field device 90 by PLC 100 through the input/output refresh in real time, and device-related information collection 165. The information collected by device-related information collection 165 includes, for example, information on usage record of field device 90.

A part or all of the functions provided by PLC 100 executing the program may be implemented as a dedicated hardware circuit.

B2. Configuration of Server 200

Figure 5:
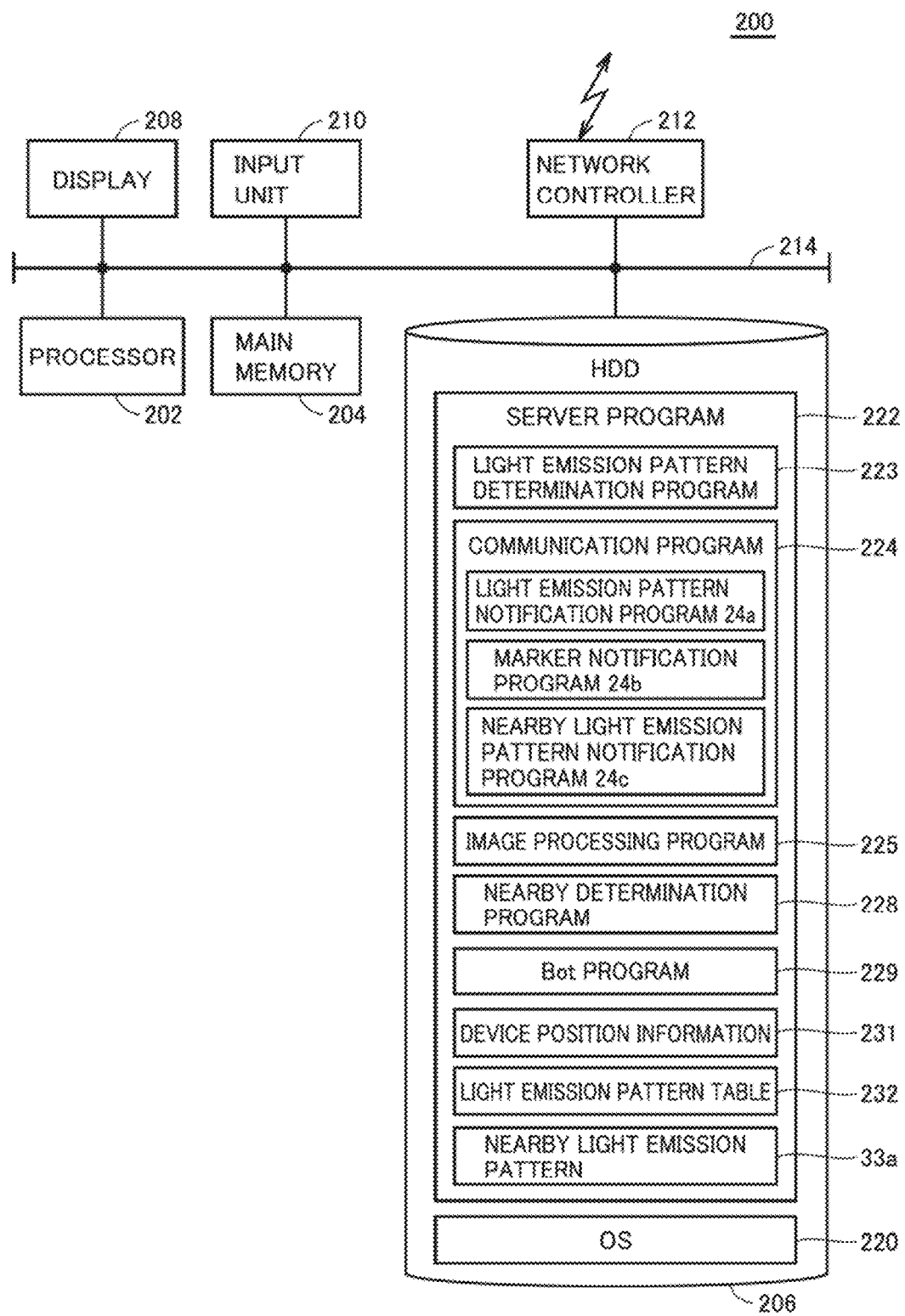
FIG. 5 is a schematic diagram illustrating a configuration example of a server 200 of the present embodiment.

FIG. 5 is a schematic diagram illustrating a configuration example of server 200 of the present embodiment. Referring to FIG. 5, server 200 is a computer having a general-purpose architecture. Server 200 realizes various processing as described later by a processor executing a program that is installed in advance.

Server 200 includes a processor 202 such as a CPU or an MPU, a main memory 204, a hard disk (HDD) 206, a display 208 for presenting information to the user, an input unit 210 such as a keyboard or a mouse, and a network controller 212 for exchanging data with other devices. These components are data-communicably connected to each other via an internal bus 214. Hard disk 206 includes an operating system (OS) 220 for providing a basic program execution environment in server 200, and a server program 222 executed under the OS. These programs are read into main memory 204 and executed by processor 202.

Server program 222 includes a program and data (information) for realizing a service of the information providing system. More specifically, server program 222 includes a light emission pattern determination program 223 for determining a light emission pattern of field device 90 for which an event has been detected, a communication program 224, an image processing program 225, a nearby determination program 228 for determining a position of another field device 90 (hereinafter, also referred to as nearby field device 90) arranged in the vicinity of field device 90 for which an event has been detected (Surrounding, Surrounding), and a Bot program 229, and further includes device position information 231, a light emission pattern table 232, and nearby light emission pattern 33a.

Device position information 231 includes a device ID of each of the plurality of field devices 90 arranged in an area of a predetermined range near field device 90 in correspondence with the device ID of each field device 90 arranged in the production line.

Communication program 224 includes a light emission pattern notification program 24a for transmitting a notification of light emission pattern 23a to PLC 100 or terminal 30, a marker notification program 24b for transmitting marker information 29a including the position and the AR marker to terminal 30, and a nearby light emission pattern notification program 24c for notifying PLC 100 of the light emission pattern of the nearby field device 90.

Figures 6, 7:
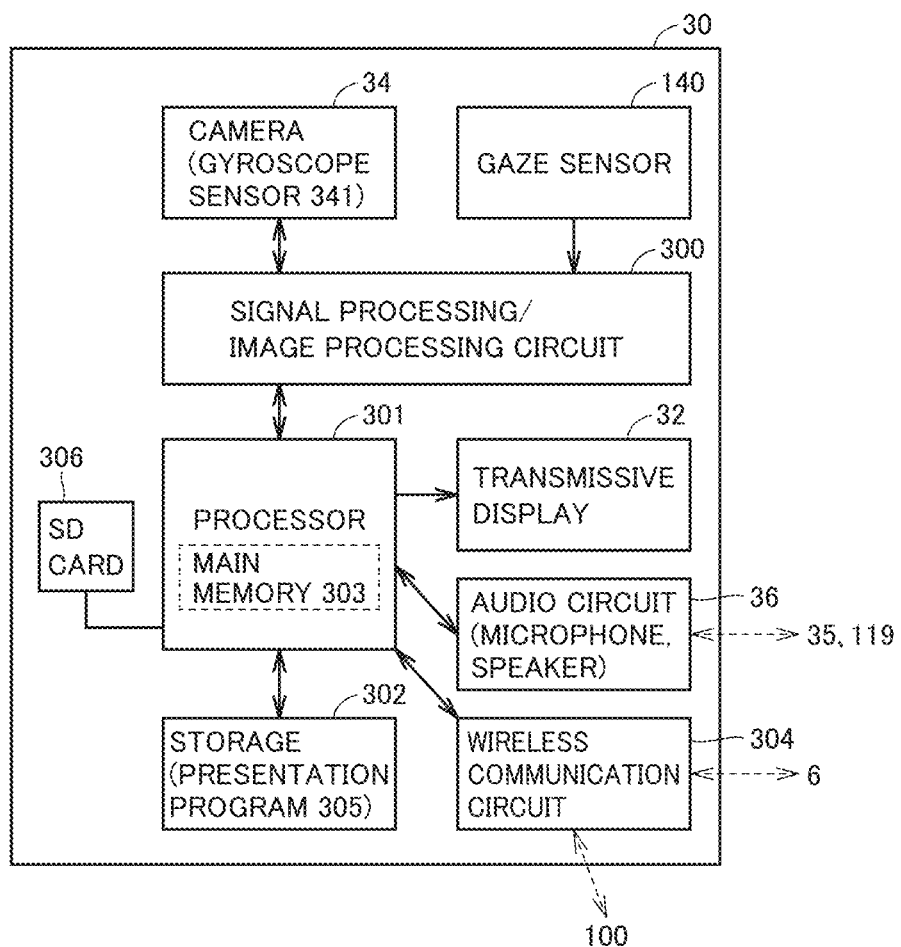
FIG. 6 is a diagram schematically illustrating an example of a light emission pattern table 232 according to the present embodiment.
FIG. 7 is a schematic diagram illustrating a configuration example of a terminal 30 according to the present embodiment.

FIG. 6 is a diagram schematically illustrating an example of light emission pattern table 232 according to the present embodiment. Referring to (A) of FIG. 6, light emission pattern table 232 includes a plurality of types of event codes 152C and a light emission pattern 152D corresponding to each of event codes 152C. Light emission pattern table 232 in (B) of FIG. 6 includes a plurality of types of device IDs 152B as identifiers of field devices 90, and light emission pattern 152D in association with each device ID 152B. In the present embodiment, light emission pattern table 232 may be configured such that light emission pattern 152D is determined according to the type of the event detected for field device 90 (event code 152C) as illustrated in (A) of FIG. 6, or may be configured such that light emission pattern 152D is determined according to the type of field device 90 (device ID 152B) as illustrated in (B) of FIG. 6.

B3. Configuration of Terminal 30

FIG. 7 is a schematic diagram illustrating a configuration example of terminal 30 according to the present embodiment. Referring to FIG. 7, to terminal 30, transmissive display 32, an audio circuit 36 that exchanges signals with microphone 119 and speaker 35, a wireless communication circuit 304 that communicates with wireless router 6 or PLC 100, a storage 302 that is a non-volatile storage medium, a memory card such as an SD card 306 that is an example of an external storage medium that can be detachably attached to terminal 30, and signal processing/image processing circuit 300 are connected, and terminal 30 includes a processor 301 such as MPU or CPU that controls these components. Processor 301 includes a main memory 303 including a read only memory (ROM), a random access memory (RAM), or the like. Terminal 30 further includes camera 34 and gaze sensor 140. Camera 34 and gaze sensor 140 are controlled by processor 301 via signal processing/image processing circuit 300, and exchange data with processor 301. In accordance with a command from processor 301, signal processing/image processing circuit 300 controls the imaging operation of camera 34, and performs image processing (noise removal, color adjustment, etc.) on a captured image output from camera 34 in units of frames, for example, and outputs the processed image. Furthermore, signal processing/image processing circuit 300 adjusts an angle or the like of camera 34 so that the image capturing direction coincides with a gazing direction on the basis of the gazing direction of the user detected by gaze sensor 140.

Processor 301 controls connected units by developing various programs including a presentation program 305 for information presentation stored in storage 302 or SD card 306 in main memory 303 and executing the programs. Further, signal processing/image processing circuit 300 can include a hardware circuit such as an application specific integrated circuit (ASIC) or a field-programmable gate array (FPGA).

B4. Configuration of Field Device 90

Figure 8:
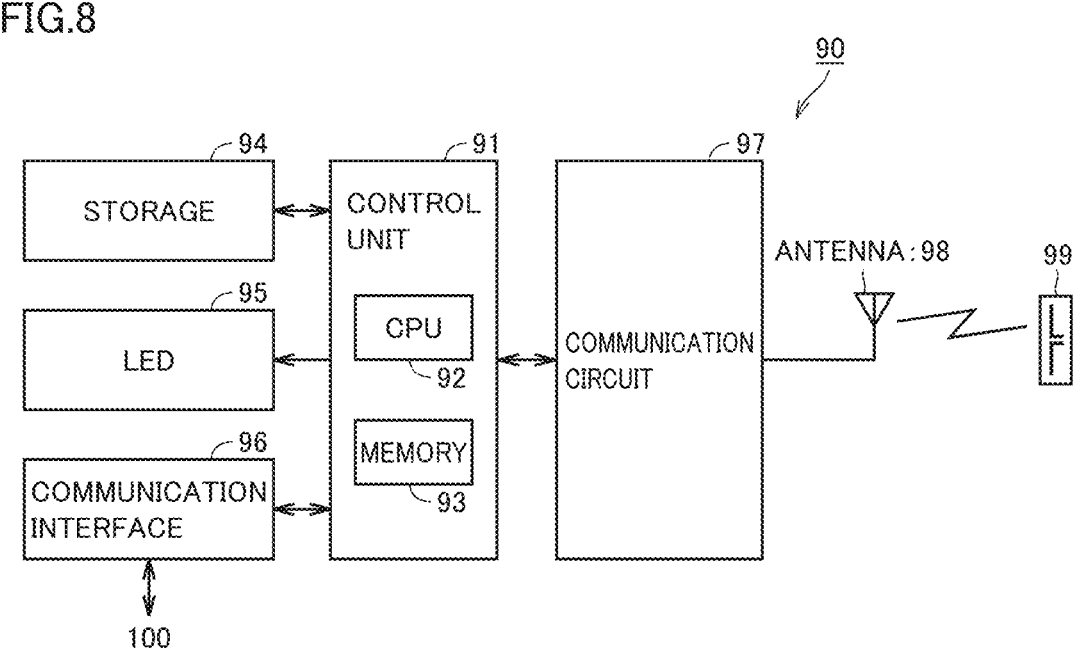
FIG. 8 is a schematic diagram illustrating a configuration example of a field device 90 according to the present embodiment.

FIG. 8 is a schematic diagram illustrating a configuration example of field device 90 according to the present embodiment. FIG. 8 illustrates a communication device that communicates with a radio frequency (RF) tag 99 in a non-contact manner as field device 90. This type of communication device corresponds to a "reader/writer" that exchanges data with RF tag 99 attached to an item to be managed (such as a workpiece carried along the production line) or an object (pallets, containers, etc.) that supports or houses the item, using a short-range wireless technology called radio frequency identification (RFID).

The communication device does not necessarily have both a function of reading data from RF tag 99 (reader function) and a function of writing data into RF tag 99 (writer function), and may have at least one of the functions.

RF tag 99 does not have a built-in power source and operates by electromotive force generated by a transmission wave from the communication device (field device 90). The communication device (field device 90) processes a reception signal from RF tag 99 passing through a communication-feasible region, and transmits state value 110 indicating a reception strength to PLC 100.

Referring to FIG. 8, field device 90 includes a communication circuit 97 for communicating with RF tag 99, an antenna 98 connected to communication circuit 97, a control unit 91 including a CPU 92 and a memory 93, a communication interface 96 for communicating with PLC 100, an LED 95 as a light source constituting a light emitting unit, and a storage 94 for storing a program and data.

CPU 92 executes various data processing including communication processing with PLC 100 and communication processing with RF tag 99 on the basis of the program stored in storage 94. CPU 92 transmits a command signal received from PLC 100 to RF tag 99 and receives a response (response) to the command signal from RF tag 99 in both the cases of reading and writing the information from and to RF tag 99. CPU 92 decodes a response content of RF tag 99, and outputs data of the communication result including the decoded data. For example, the communication result is transmitted to PLC 100, stored in storage 94, or displayed using LED 95. PLC 100 compares the reception strength (current value) of RF tag 99 indicated by the response content from RF tag 99 with a threshold value, and determines whether the communication device (field device 90) is in an abnormal state or a sign state indicating a sign of abnormality, that is, detects an event on the basis of the comparison result.

The type of field device 90 is not limited to the RFID communication device, and may be, for example, a proximity switch that can notify an amount of received light by the LED.

B5. Module Configuration of PLC 100

Figure 9:
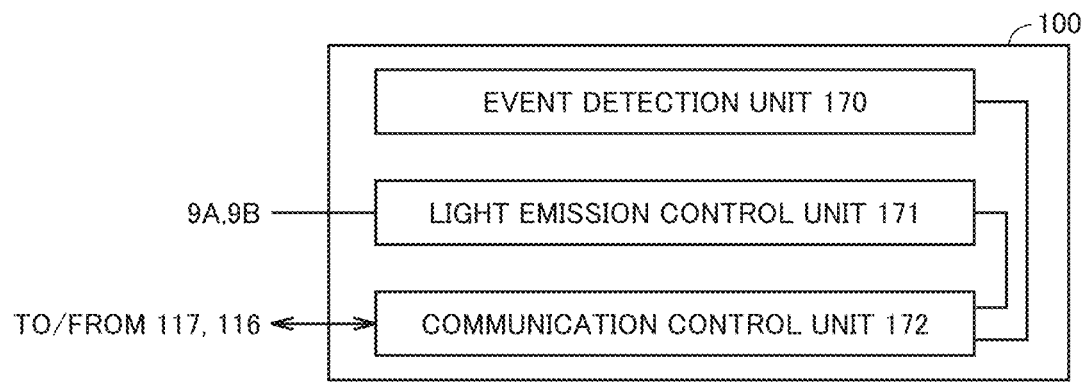
FIG. 9 is a diagram schematically illustrating a module configuration related to information presentation of PLC 100 according to the present embodiment.

FIG. 9 is a diagram schematically illustrating a module configuration related to information presentation of PLC 100 according to the present embodiment. Referring to FIG. 9, PLC 100 includes, as modules configured by executing a program, an event detection unit 170 corresponding to event detection program 161, a light emission control unit 171 corresponding to light emission program 167 or nearby light emission program 167a, and a communication control unit 172 that controls communication with other devices by a program of network controller 116 or wireless interface 117.

Event detection unit 170 detects an event of field device 90. More specifically, event detection unit 170 searches event code table 152 for event type 152A corresponding to device ID 152B matching the device ID of the state value 110 received from field device 90. Event detection unit 170 compares received state value 110 with threshold value TH of searched event type 152A, and when determining that the comparison result indicates (state value 110>threshold value TH), field device 90 detects that the field device is in the abnormal state or the sign state indicated by event type 152A, and searches event code 152C corresponding to event type 152A from event code table 152. For example, on the basis of state value 110 from the RFID communication device (field device 90), event detection unit 170 detects that the state of the communication device (field device 90) indicated by event type 152A ("output abnormality of communication device") indicated by the arrow 1521 in event code table 152 of FIG. 4 is abnormal. When event detection unit 170 detects an event, communication control unit 172 transmits a notification of event content 22a including the device ID of field device 90 and event code 152C to server 200.

Light emission control unit 171 generates light emission command 9A on the basis of light emission pattern 23a received by communication control unit 172 from server 200, and transmits light emission command 9A to field device 90 indicated by light emission pattern 23a via communication control unit 172. In addition, light emission control unit 171 generates light emission command 9B on the basis of nearby light emission pattern 33a received by communication control unit 172 from server 200, and transmits light emission command 9B to field device 90 indicated by one or more device IDs indicated by nearby light emission pattern 33a via communication control unit 172.

B6. Module Configuration of Server 200

Figure 10:
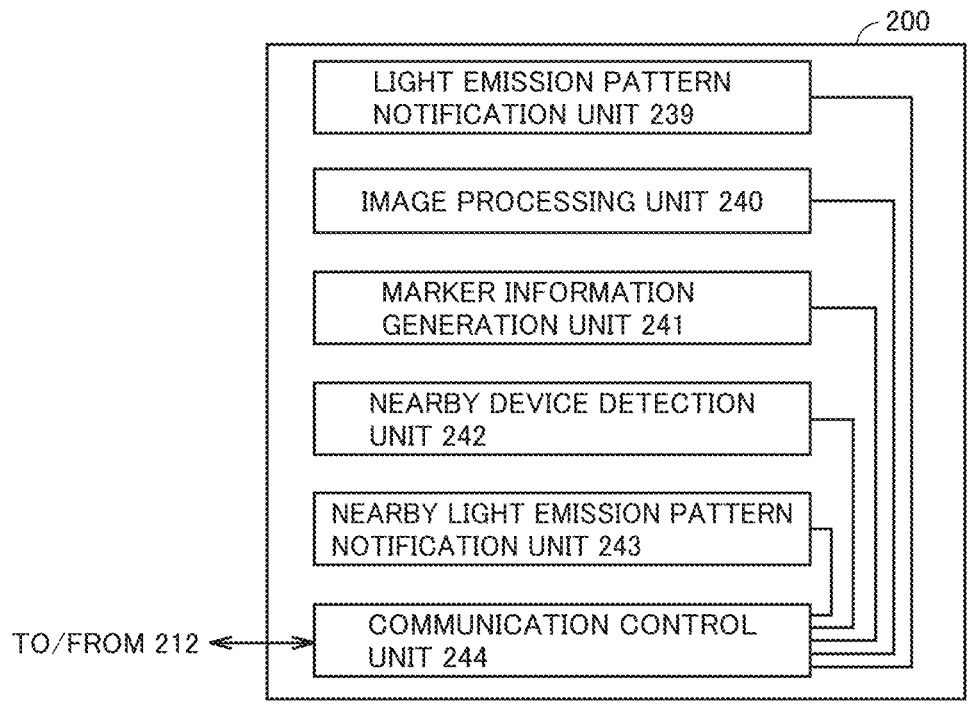
FIG. 10 is a diagram schematically illustrating a module configuration related to information presentation of server 200 according to the present embodiment.

FIG. 10 is a diagram schematically illustrating a module configuration related to information presentation of server 200 according to the present embodiment. Referring to FIG. 10, server 200 includes, as modules configured by executing the program, a light emission pattern notification unit 239 corresponding to light emission pattern notification program 24a, an image processing unit 240 corresponding to image processing program 225, a marker information generation unit 241 corresponding to marker notification program 24b, a nearby device detection unit 242 corresponding to nearby determination program 228, a nearby light emission pattern notification unit 243 corresponding to nearby light emission pattern notification program 24c, and a communication control unit 244 that controls communication with other devices by a program of network controller 212.

Light emission pattern notification unit 239 searches light emission pattern table 232 ((A) of FIG. 6) on the bases of event code 152C received from PLC 100 for light emission pattern 152D corresponding to event code 152C indicated by event content 22a, and transmits a notification of light emission pattern 23a indicating searched light emission pattern 152D to PLC 100 via communication control unit 244.

In addition, light emission pattern notification unit 239 transmits a notification of a light emission pattern on the basis of the device ID. Specifically, light emission control unit 171 searches light emission pattern table 232 ((B) of FIG. 6) for light emission pattern 152D corresponding to device ID 152B matching the device ID indicated by event content 22a received from PLC 100 or the device ID of field device 90 received from terminal 30, and transmits a notification of light emission pattern 23a indicating light emission pattern 152D that has been searched for to PLC 100 via communication control unit 244.

Image processing unit 240 receives image 27a captured by camera 34 received from terminal 30 via communication control unit 244, and performs the above-described position detection processing on image 27a that has been received to determine and output the position of the partial image that emits light in light emission pattern 23a. More specifically, in a case where the light emission pattern is periodic blinking, frame images of image 27a including blinking images are arranged in order of time of taking images, frames in which the light source (LED 95) is on and frames in which the light source is off are classified based on the time axis, and the light emission pattern of LED 95 is detected on the basis of a result of the classification. Image processing unit 240 collates the detected light emission pattern with light emission pattern 23a, and when the collation result indicates that both coincide with each other, image processing unit 240 detects the position of the partial image (partial image of the light source) indicating the light emission pattern in image 27a.

Marker information generation unit 241 generates marker information 29a including the position of the partial image and the AR marker described above, and transmits the marker information to terminal 30 via communication control unit 244. Marker information generation unit 241 generates an AR marker indicating information regarding field device 90 that emits light in light emission pattern 23a. The AR marker may include, for example, the device ID of field device 90, information of an event detected for field device 90, information indicating state value 110 of field device 90, and the like, but the type of information is not limited thereto.

Nearby device detection unit 242 detects a plurality of field devices 90 arranged near field device 90 that emit light in light emission pattern 23a in the production line. More specifically, nearby device detection unit 242 acquires (detects) the device ID (hereinafter also referred to as nearby device ID) of the nearby field device 90 associated with the device ID of field device 90 that emits light in light emission pattern 23a from device position information 231.

Nearby light emission pattern notification unit 243 transmits the notification of nearby light emission pattern 33a to PLC 100 via communication control unit 244. Nearby light emission pattern 33a indicates a predetermined light emission pattern for causing field device 90 indicated by the nearby device ID detected by nearby device detection unit 242 to emit light.

B7. Module Configuration of Terminal 30

Figure 11:
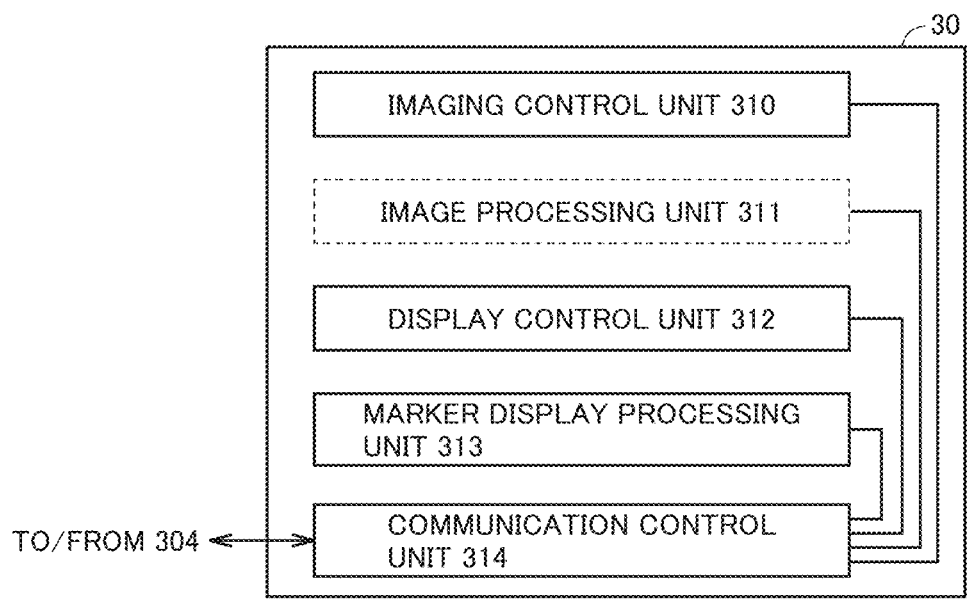
FIG. 11 is a diagram schematically illustrating a module configuration related to information presentation of terminal 30 according to the present embodiment.

FIG. 11 is a diagram schematically illustrating a module configuration related to information presentation of terminal 30 according to the present embodiment. Referring to FIG. 11, terminal 30 includes, as modules configured by executing a program stored in storage 302, an imaging control unit 310 that controls camera 34, an image processing unit 311 that processes a captured image from camera 34, a marker display processing unit 313, a display control unit 312 that controls transmissive display 32 to display an image, and a communication control unit 314 that controls wireless communication circuit 304.

Marker display processing unit 313 generates display control data for displaying the AR marker in association with the position in the display area of transmissive display 32 corresponding to the determined position of marker information 29a received from server 200, and outputs the display control data to display control unit 312. Display control unit 312 drives transmissive display 32 according to the display control data. As a result, in the display area of transmissive display 32, the AR marker object is displayed in a superimposed manner over the scenery in the real space in the user's view field, that is, the scenery in the real space including field device 90.

Image processing unit 311 has a function similar to that of image processing unit 240 of server 200. Image processing unit 311 detects a position of a partial image whose luminance is changed according to light emission pattern 23a in image 27a captured by camera 34. As a result, the display position of the AR marker in the display area of transmissive display 32 can be determined by terminal 30 instead of server 200.

<C. Flowchart>

Figure 12:
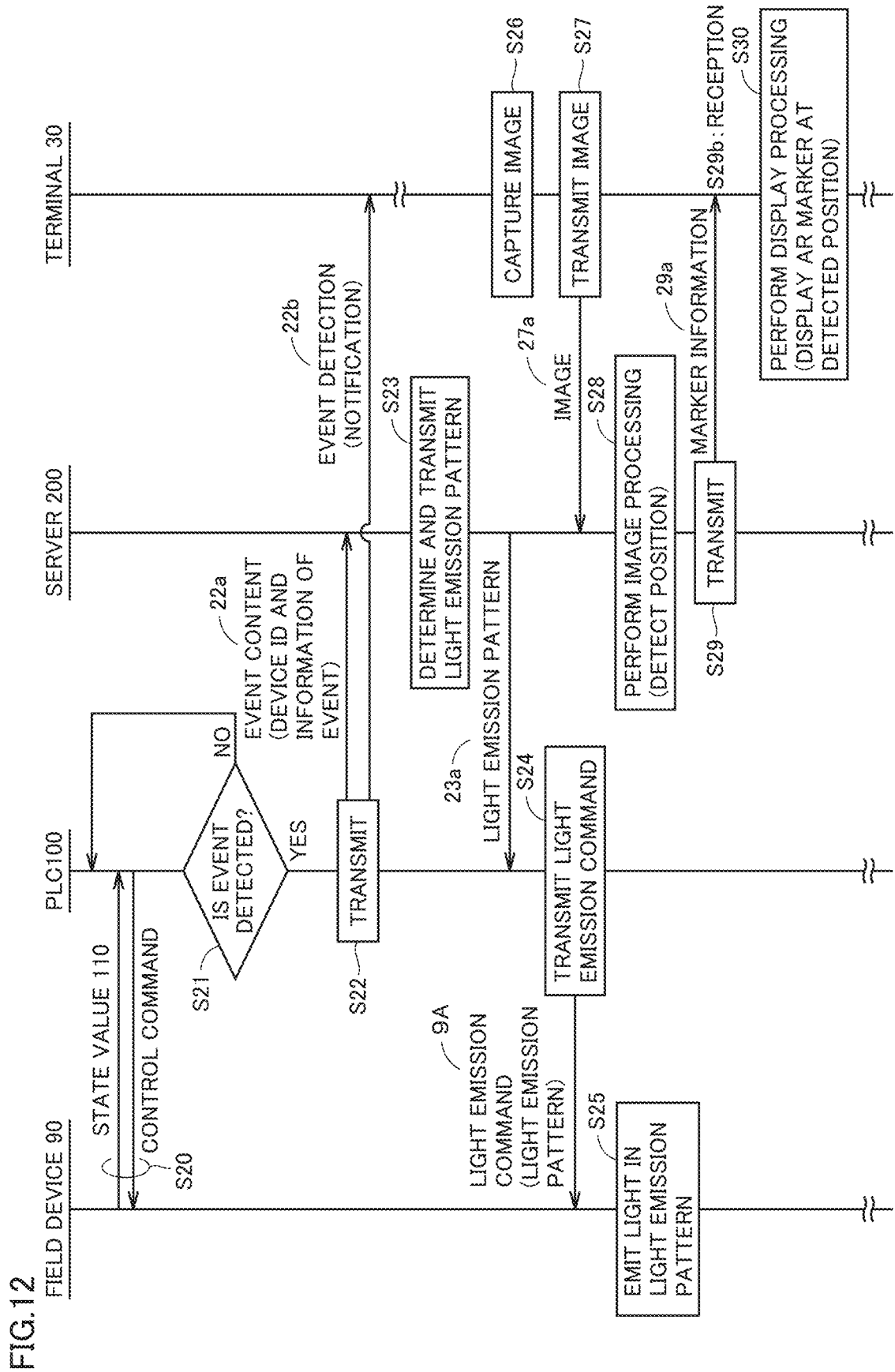
FIG. 12 is a flowchart showing information presentation processing according to the present embodiment.

FIG. 12 is a flowchart showing information presentation processing according to the present embodiment. Referring to FIG. 12, PLC 100 exchanges state value 110 and the control command with field device 90 (step S20). PLC 100 detects the presence or absence of an event on the basis of state value 110 from field device 90 (step S21). When no event is detected (NO in step S21), the process returns to step S20. When an event is detected (YES in step S21), PLC 100 transmits a notification of event content 22a to server 200, and transmits a notification of event detection 22b indicating that an event is detected to terminal 30 worn by the user (step S22). Event content 22a includes the device ID of field device 90 and information regarding an event such as event code 152C. Terminal 30 may notify the user of event detection 22b received from PLC 100 by, for example, outputting a voice from speaker 35 or displaying an AR marker on transmissive display 32.

Server 200 determines the light emission pattern on the basis of event content 22a from the PLC 100, and transmits a notification of determined light emission pattern 23a to PLC 100 (step S23). Light emission pattern 23a is a predetermined pattern, and specifically indicates a pattern based on light emission pattern 152D corresponding to event code 152C retrieved from light emission pattern table 232 in (A) of FIG. 6 or light emission pattern 152D corresponding to the device ID (device ID 152B) of field device 90 retrieved from light emission pattern table 232 in (B) of FIG. 6.

PLC 100 generates light emission command 9A for causing LED 95 to emit light in this pattern on the basis of light emission pattern 23a received from server 200, and transmits light emission command 9A to field device 90 (step S24). Field device 90 controls LED 95 to light up (emit light) according to light emission command 9A received from PLC 100 (step S25).

The user gazes at field device 90 that starts lighting according to the pattern. When gaze sensor 140 detects the gaze direction upon reception of the notification of event detection 22b, terminal 30 causes camera 34 to start imaging so that the detected gazing direction is set as the image capturing direction (step S26). Terminal 30 transmits image 27a acquired by imaging to server 200 (step S27).

Server 200 detects the position of the partial image of the light source (LED 95) blinking according to the light emission pattern 23a in image 27a from the terminal 30 by the image processing (step S28). Server 200 transmits marker information 29a including the detected position and the AR marker to terminal 30 (step S29).

Terminal 30 receives marker information 29a from server 200 (step S29b), and controls transmissive display 32 according to the display control data based on marker information 29a that has been received (step S30). As a result, transmissive display 32 displays the AR marker in association with the position of field device 90 (more specifically, LED 95) present in the real landscape in the view field of the user (step S30).

C1. Modified Example of Processing

Figure 13:
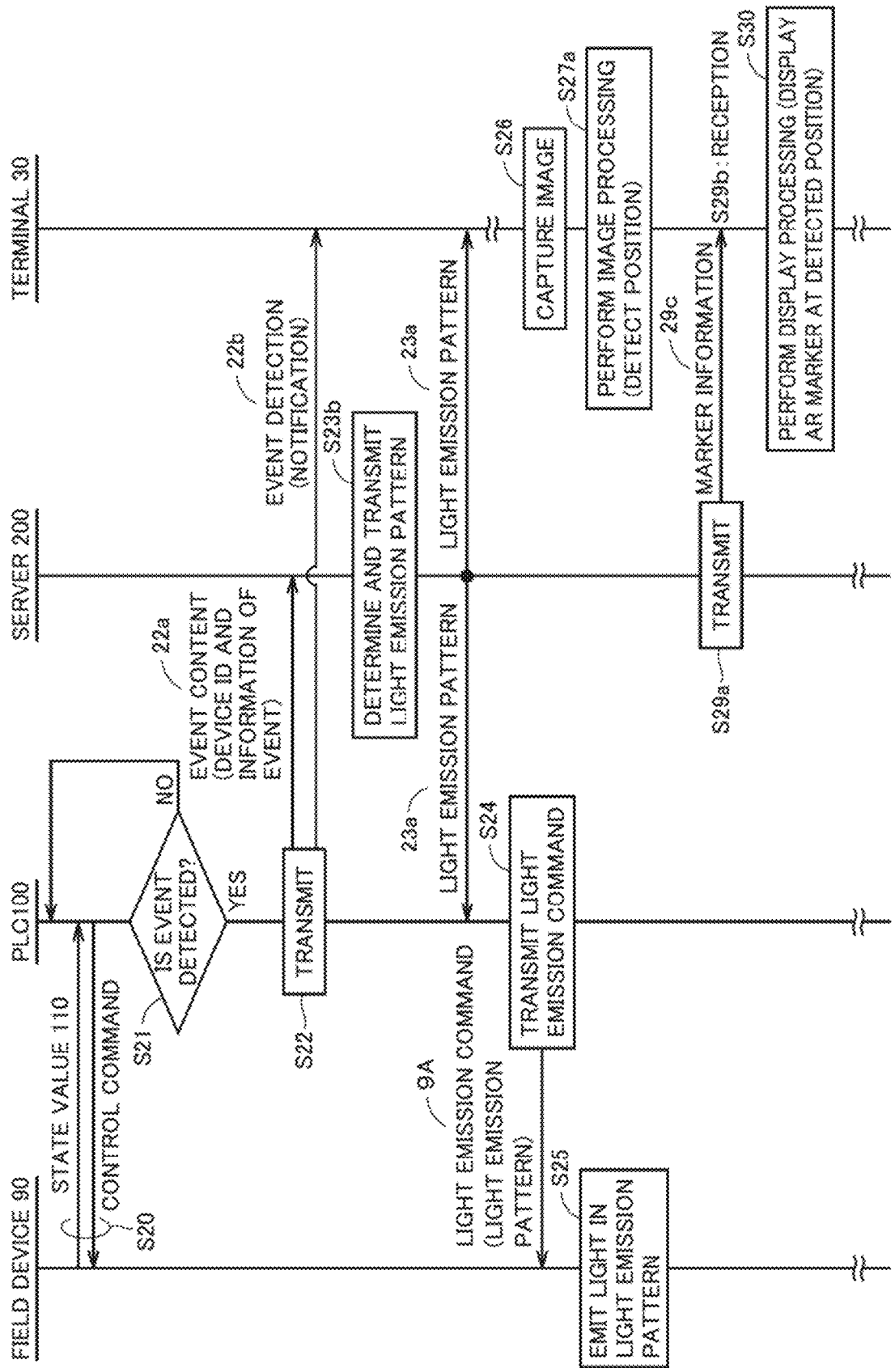
FIG. 13 is a flowchart showing a modified example of the information presentation processing according to the present embodiment.

FIG. 13 is a flowchart showing a modified example of the information presentation processing according to the present embodiment. In the processing of FIG. 12 described above, server 200 detects the position of the partial image of the light source (LED 95) indicating light emission pattern 23a in image 27a, but the position detection processing may be performed by terminal 30 as illustrated in FIG. 13, instead of server 200.

More specifically, server 200 transmits the notification of light emission pattern 23a to terminal 30 (step S23b), and transmits marker information 29b including the AR marker to terminal 30 (step S29a). Terminal 30 performs image processing on image 27a captured by camera 34 to detect a position of a partial image blinking in light emission pattern 23a in image 27a (step S27a). Terminal 30 generates display control data for displaying the AR marker indicated by marker information 29c from server 200 in association with the position detected in image 27a, and controls transmissive display 32 on the basis of the display control data (step S30). The other processing of FIG. 13 is similar to the processing shown in FIG. 12, and thus the description thereof will not be repeated.

C2. Lighting Processing of Nearby Field Device 90

In the processing of FIGS. 12 and 13, server 200 may cause another field device 90 arranged in the vicinity of target field device 90 that is caused to emit light according to the light emission pattern 23a to emit light in nearby light emission pattern 33a (pattern different from light emission pattern 23a). The user wearing terminal 30 can easily specify the position of target field device 90 and gaze at target field device 90 using field device 90 emitting light in nearby light emission pattern 33a as a guide in the view field through transmissive display 32. For example, even if target field device 90 is arranged in the blind spot of the user, the user can easily move target field device 90 to a position where the target field device can be placed in the view field of the user by using field device 90 emitting light in nearby light emission pattern 33a as a guide.

C3. User Designation Processing of Field Device 90

In the processing of FIGS. 12 and 13, target field device 90 to be caused to emit light according to light emission pattern 23a is field device 90 in which the event is detected, but target field device 90 is not limited to field device 90 for which the event is detected. For example, it may be field device 90 designated by the user.

More specifically, the user designates the device ID by utterance. Terminal 30 receives the voice of the utterance from microphone 119 and transfers received voice data to server 200. The Bot service provided by executing Bot program 229 of server 200 performs voice recognition processing on the voice data from terminal 30 to acquire device ID 152B, and searches light emission pattern 152D corresponding to acquired device ID 152B from light emission pattern table 232. The Bot service transmits a notification of light emission pattern 23a on the basis of device ID 152B and the light emission pattern 152D to PLC 100. As a result, it is possible to designate target field device 90 to be caused to emit light according to light emission pattern 23a by a user operation regardless of the event detection.

At the time of event detection or user designation, the information displayed by the AR marker on transmissive display 32 may include the information of state value 110 (that is, state value 110 accumulated in a DB 400) of target field device 90 retrieved from DB 400 by server 200, or state value 110 (that is, state value 110 collected in real time) of target field device 90 received from PLC 100 by server 200. Furthermore, the user can specify information (accumulated information in DB 400 or information collected from PLC 100 in real time) to be indicated by the AR marker by the utterance.

The processing of terminal 30 illustrated in FIGS. 12, 13, and the like is realized mainly by presentation program 305 being executed by processor 301.

D. Display Example

Figure 14:
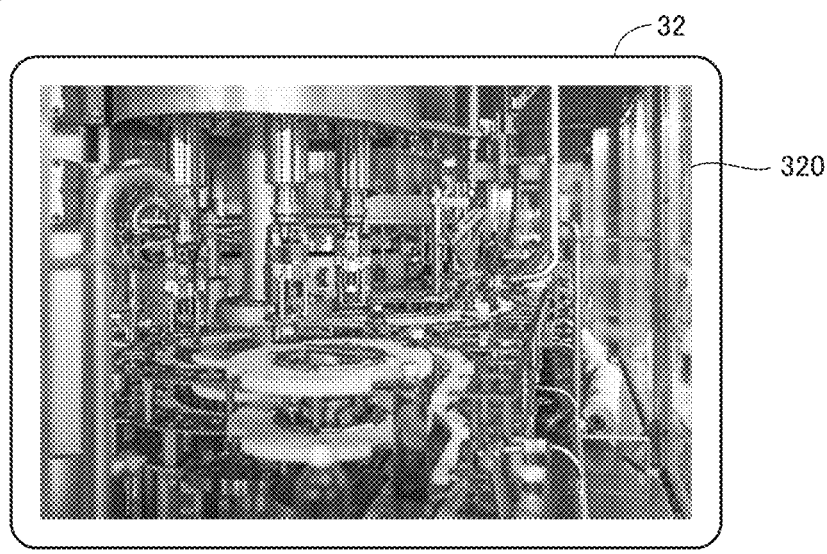
FIG. 14 is a diagram illustrating a display example of a transmissive display 32 according to the present embodiment.
Figure 15:
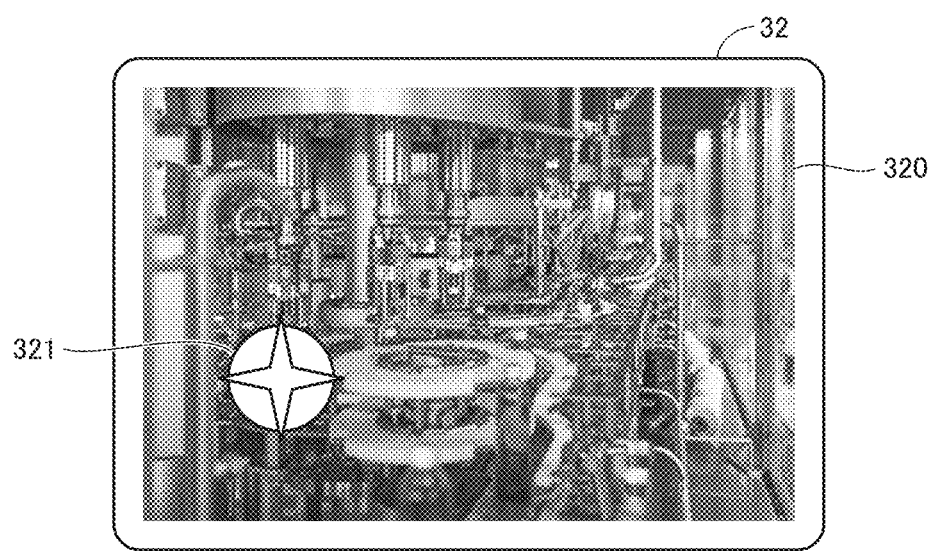
FIG. 15 is a diagram illustrating a display example of transmissive display 32 according to the present embodiment.

FIGS. 14 to 17 are diagrams illustrating display examples of transmissive display 32 according to the present embodiment. In FIG. 14, no object is displayed on transmissive display 32, and in FIG. 14, only the scenery in a view field 320 of the user through transmissive display 32 is shown. In view field 320, the user views field device 90 provided in the production line. In view field 320 of the user in FIG. 15, LED 95 of field device 90 is lighting 321 according to light emission command 9A. When the user gazes at lighting 321, camera 34 captures an image taking the user's gazing direction as the image capturing direction. The position of the partial image of lighting 321 in image 27a is determined by the position determination processing for image 27a that has been captured.

Figure 16:
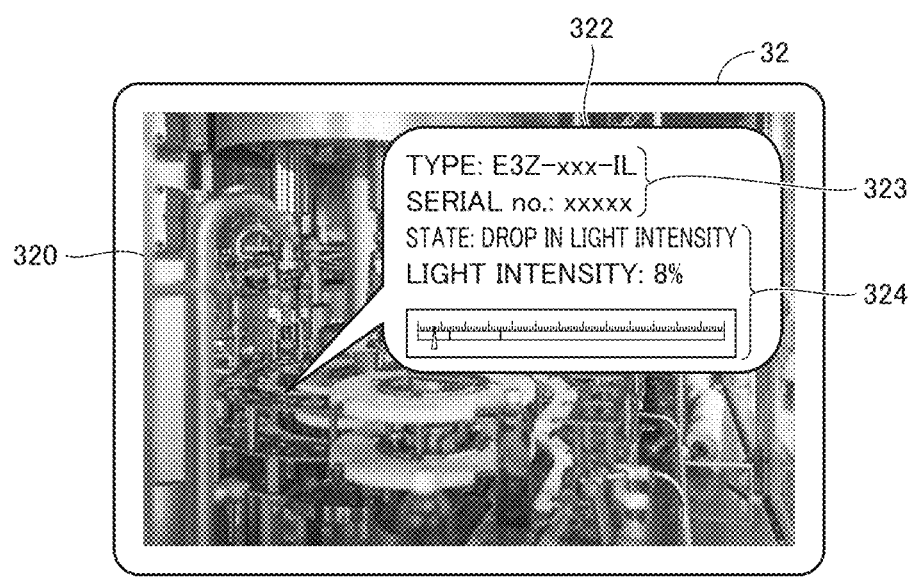
FIG. 16 is a diagram illustrating a display example of transmissive display 32 according to the present embodiment.

In FIG. 16, on transmissive display 32, an AR marker 322, which is information regarding field device 90, is displayed in association with the determined position. In FIG. 16, AR marker 322 is displayed in a balloon from the location site of field device 90, for example, in a superimposed manner over the scenery of the user's view field. AR marker 322 includes, in the balloon, an object of information 324 based on identification information 323 (device ID, model number, etc.) and state value 110 of field device 90 in which the event has been detected or field device 90 designated by the user. Information 324 includes information about an abnormality or a sign (for example, decrease in light amount), state value 110 (light amount), and an indicator indicating a state. Note that information 324 of the object is not limited thereto. Furthermore, when AR marker 322 is displayed, the light emission of lighting 321 may be stopped.

In a case where information 324 is on the basis of information stored in the DB 400, the information may be information (for example, a trend graph or the like) indicating a temporal change of the accumulated state value 110.

Figure 17:
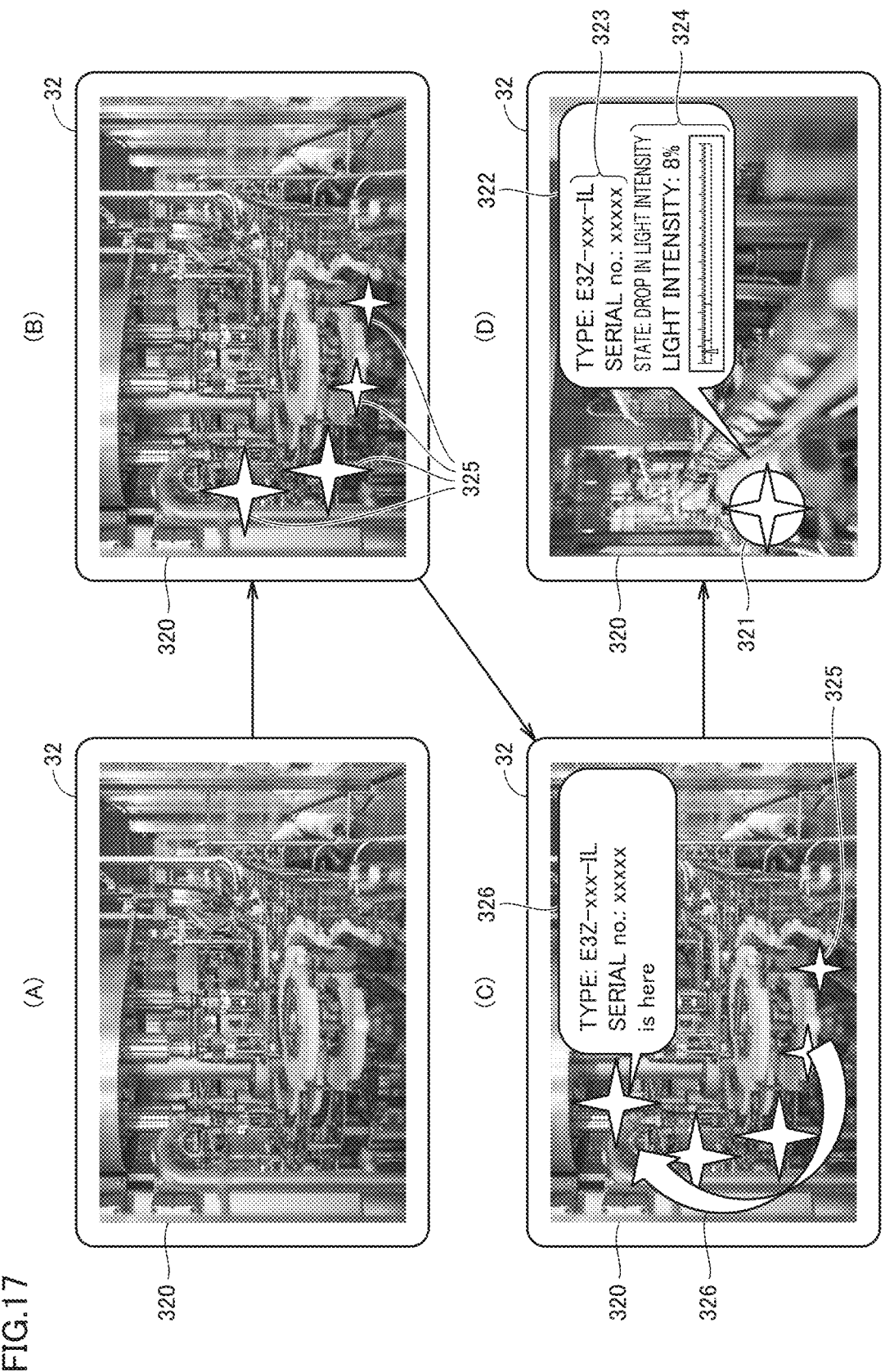
FIG. 17 is a diagram illustrating a display example of transmissive display 32 according to the present embodiment.

In FIG. 17, LED 95 of nearby field device 90 is turned to lighting 325 according to nearby light emission pattern 33a. When lighting 325 starts in view field 320 in (A) of FIG. 17 (part (B) of FIG. 17), lighting 325 of nearby field device 90 directs (guides) the user to the location site of target field device 90. As illustrated in (C) of FIG. 17, the object of a guide 326 includes an arrow extending in the direction of the location site, a balloon including identification information of target field device 90, or the like. When the user is prompted by guide 326 to confirm and gaze at the lighting of target field device 90, transmissive display 32 displays the object of AR marker 322 in association with the display position of target field device 90 as illustrated in (D) of FIG. 17.

Modified Example

In the present embodiment, the number of target field device 90 that emits light in light emission pattern 23a is one, but more than one target field device may be used. In this case, target field device 90 may emit light with a time difference, change a light emission pattern (blinking pattern), change a light emission color, or change a light emission frequency (blinking cycle), etc.

Furthermore, in a case where server 200 communicates with a plurality of terminals 30, server 200 may notify the plurality of terminals 30 of light emission pattern 23a by broadcasting and notify of event detection.

In addition to the light emission in light emission pattern 23a, sound may be output. In addition, starting/stopping of light emission may be performed in time synchronization with the control cycle.

The type of terminal 30 is not limited to a head-mounted type or a glass-type, and may use a tablet terminal or a smartphone-type terminal having a camera and a display.

Furthermore, the display included in terminal 30 may be a non-transmissive display.

Furthermore, transmissive display 32 is not limited to an optical transmissive type that transmits external light to transmit the scenery in the real space, and may be a video transmissive type. In a case where a video transmissive display is adopted, terminal 30 displays the captured image output from camera 34 on the video transmissive display.

E. Program

The presentation of information illustrated in FIGS. 14 to 17 in terminal 30 can be realized by processor 301 executing software of presentation program 305. Presentation program 305 may be stored in a storage unit such as storage 302 or SD card 306. When processor 301 executes necessary programs, target programs (various programs including presentation program 305) stored in the storage unit are expanded in the RAM of main memory 303. Then, processor 301 interprets and executes the program expanded in the RAM to realize presentation of information.

Processor 301 includes a CPU, an MPU, main memory 303, and the like, and controls the components of terminal 30 according to information processing. Storage 302 is, for example, an auxiliary storage device such as a hard disk drive or a solid state drive, and stores presentation program 305 executed by processor 301, related information, and the like.

The external storage medium such as SD card 306 is a medium that accumulates information such as a program by electrical, magnetic, optical, mechanical, or chemical action so that a computer, other devices, a machine, or the like can read the information such as a program recorded therein. Terminal 30 may acquire presentation program 305 from SD card 306 of the external storage medium. In addition, presentation program 305 may be provided by being downloaded to terminal 30 via an external network and wireless communication circuit 304.

F. Additional Statement

The present embodiment described above includes the following technical ideas.

[Configuration 1]
An information presentation system (1) including:
a controller (100) configured to control a device (90) included in a production line;
a terminal (30) including a display (32) and a camera (34) configured to capture an image of the device; and
a server (200) configured to communicate with the controller and the terminal, wherein
the camera has an image capture range including a view field of the display,
the controller includes a module configured to transmit a light emission command (9A) to the device, the light emission command causing a light emitting unit (95) included in the device to emit light in a predetermined light emission pattern (23a), and
the terminal includes a module configured to display information regarding the device in association with a display position in a display area of the display, the display position corresponding to a position of a partial image representing the light emission pattern in a captured image of the camera.

[Configuration 2]
The information presentation system according to configuration 1, wherein
the controller further includes a module configured to cause a light emitting unit included in another device near the device to emit light in a pattern (33433a) different from the light emission pattern.

[Configuration 3]
The information presentation system according to configuration 1 or 2, wherein
the information regarding the device includes information indicating a state of the device.

[Configuration 4]
The information presentation system according to any one of configurations 1 to 3, wherein
the server transmits a notification for specifying the light emission pattern to the controller (S23).

[Configuration 5]
The information presentation system according to any one of configurations 1 to 4, wherein
the server includes:
an image processing module (240) configured to process the captured image received from the terminal, and detect a position of the partial image representing the light emission pattern in the captured image; and
a module configured to transmit the position of the partial image detected by the image processing module to the terminal (S29).

[Configuration 6]
The information presentation system according to any one of configurations 1 to 4, wherein
the server transmits a notification for specifying the light emission pattern to the terminal (S23), and the terminal further includes an image processing module (311) configured to process the captured image of the camera, and detect a position of the partial image representing the light emission pattern in the captured image.

[Configuration 7]
The information presentation system according to any one of configurations 1 to 6, wherein
the server determines the light emission pattern based on identification information of the device (FIG. 6(A)).

[Configuration 8]
The information presentation system according to any one of configurations 1 to 7, wherein
the server determines the light emission pattern based on a state of the device (FIG. 6(B)).

[Configuration 9]
The information presentation system according to configuration 7, wherein
the controller determines a state of the device based on a state value output from the device, and transmits a notification (22a) of the determined state to the server.

[Configuration 10]
The information presentation system according to configuration 7, wherein
the controller transmits a database operation command to the server, the database operation command being for storing information indicating a state of the device in a database included in the server, and
the server determines the state of the device based on the information stored in the database.

[Configuration 11]
The information presentation system according to any one of configurations 1 to 10, wherein
the controller outputs the light emission command to a device designated based on a user operation.

[Configuration 12]
The information presentation system according to any one of configurations 1 to 11, wherein
the terminal further includes a gaze sensor (140) configured to detect a gazing direction of a user operating the terminal, and
an image capturing direction of the camera coincides with the gazing direction.

[Configuration 13]
A terminal device (30) including:
a module (314) configured to communicate with a controller (100) that controls a device (90) included in a production line;
a display (32); and
a camera (34) configured to capture an image of the device, wherein
the camera has an image capture range including a view field of the display,
the device includes a light source (95) configured to emit light in a predetermined light emission pattern (23a) based on a light emission command (9A) from the controller, and
the terminal device further includes a module (312) configured to display information regarding the device in association with a display position in a display area of the display, the display position corresponding to a position of a partial image representing the light emission pattern in a captured image of the camera.

[Configuration 14]
A non-transitory machine-readable recording medium having stored thereon a program (305), when executed by a processor (301), for causing the processor (301) included in a terminal device (30) to perform an information presentation method, wherein the terminal device includes:
a module (314) configured to communicate with a controller (100) that controls a device (90) included in a production line;
a display (32); and
a camera (34) configured to capture an image of the device,
the camera has an image capture range including a view field of the display,
the device includes a light source (95) configured to emit light in a predetermined light emission pattern (23a) based on a light emission command (9A) from the controller, and
the information presentation method includes:
acquiring a position (29a) that is a display position in a display area of the display and that is a position of a partial image representing the light emission pattern in a captured image of the camera (S29b); and
controlling the display to display information regarding the device in association with the acquired display position in the display area of the display (S30).

The embodiment disclosed herein should be considered to be illustrative in all respects and not restrictive. The scope of the present invention is defined by the claims, instead of the descriptions stated above, and it is intended that meanings equivalent to the claims and all modifications within the scope are included.

REFERENCE SIGNS LIST

1: network system, 9A, 9B: light emission command, 22a: event contents, 22b: event detection, 32: transmissive display, 23a, 152D: light emission pattern, 24a: light emission pattern notification program, 24b: marker notification program, 24c: nearby light emission pattern notification program, 27a: image, 29a, 29b: marker information, 30: terminal, 33a: nearby light emission pattern, 34: camera, 35: speaker, 36: audio circuit, 90: field device, 110: state value, 140: gaze sensor, 152: event code table, 152A: event type, 152C: event code, 160: IoT gateway program, 161: event detection program, 162: information collection program, 163: state information collection, 164: control command collection, 167: light emission program, 167a: nearby light emission program, 170: event detection unit, 171: light emission control unit, 172, 244, 314: communication control unit, 200: server, 223: light emission pattern determination program, 225: image processing program, 228: nearby determination program, 231: device position information, 232: light emission pattern table, 239: light emission pattern notification unit, 240, 311: image processing unit, 241: marker information generation unit, 242: nearby device detection unit, 243: nearby light emission pattern notification unit, 305: presentation program, 310: imaging control unit, 312: display control unit, 313: marker display processing unit, 320: view field, 321, 325: lighting, 322: AR marker, 323: identification information, 326: guide, 400: database

The invention claimed is:

1. An information presentation system comprising: a controller configured to control a device included in a production line; a terminal including a display and a camera configured to capture an image of the device; and a server configured to communicate with the controller and the terminal, wherein the camera has an image capture range including a view field of the display, the controller includes a module configured to transmit a light emission command to the device, the light emission command causing a light emitting unit included in the device to emit light in a predetermined light emission pattern, and the terminal includes a module configured to display information regarding the device in association with a display position in a display area of the display, the display position corresponding to a position of a partial image representing the light emission pattern in a captured image of the camera; and wherein the controller further includes a module configured to cause a light emitting unit included in another device near the device to emit light in a pattern different from the light emission pattern.

2. The information presentation system according to claim 1, wherein the information regarding the device includes information indicating a state of the device.

3. The information presentation system according to claim 1, wherein the server transmits a notification for specifying the light emission pattern to the controller.

4. The information presentation system according to claim 1, wherein the server includes:
an image processing module configured to process the captured image received from the terminal, and detect a position of the partial image representing the light emission pattern in the captured image; and
a module configured to transmit the position of the partial image detected by the image processing module to the terminal.

5. The information presentation system according to claim 1, wherein
the server transmits a notification for specifying the light emission pattern to the terminal, and
the terminal further includes an image processing module configured to process the captured image of the camera, and detect a position of the partial image representing the light emission pattern in the captured image.

6. The information presentation system according to claim 1, wherein the server determines the light emission pattern based on identification information of the device.

7. The information presentation system according to claim 1, wherein the server determines the light emission pattern based on a state of the device.

8. The information presentation system according to claim 6, wherein the controller determines a state of the device based on a state value output from the device, and transmits a notification of the determined state to the server.

9. The information presentation system according to claim 6, wherein
the controller transmits a database operation command to the server, the database operation command being for storing information indicating a state of the device in a database included in the server, and
the server determines the state of the device based on the information stored in the database.

10. The information presentation system according to claim 1, wherein the controller outputs the light emission command to a device designated based on a user operation.

11. The information presentation system according to claim 1, wherein
the terminal further includes a gaze sensor configured to detect a gazing direction of a user operating the terminal, and
an image capturing direction of the camera coincides with the gazing direction.

12. A terminal device comprising: a module configured to communicate with a controller that controls a device included in a production line; a display; and a camera configured to capture an image of the device, wherein the camera has an image capture range including a view field of the display, the device includes a light source configured to emit light in a predetermined light emission pattern based on a light emission command from the controller, and the terminal device further includes a module configured to display information regarding the device in association with a display position in a display area of the display, the display position corresponding to a position of a partial image representing the light emission pattern in a captured image of the camera; and wherein the controller further includes a module configured to cause a light emitting unit included in another device near the device to emit light in a pattern different from the light emission pattern.

13. A non-transitory machine-readable recording medium having stored thereon a program which, when executed by a processor, causes the processor included in a terminal device to perform an information presentation method, wherein the terminal device includes: a module configured to communicate with a controller that controls a device included in a production line; a display; and a camera configured to capture an image of the device, the camera has an image capture range including a view field of the display, the device includes a light source configured to emit light in a predetermined light emission pattern based on a light emission command from the controller, and the information presentation method includes: acquiring a position that is a display position in a display area of the display and that is a position of a partial image representing the light emission pattern in a captured image of the camera; and controlling the display to display information regarding the device in association with the acquired display position in the display area of the display; and wherein the controller further includes a module configured to cause a light emitting unit included in another device near the device to emit light in a pattern different from the light emission pattern.

\* \* \* \* \*